March 29, 1966 R. J. SCHWAB 3,243,024
PRESSURE RELEASE DRIVE MECHANISM
Filed Nov. 1, 1963 2 Sheets-Sheet 1
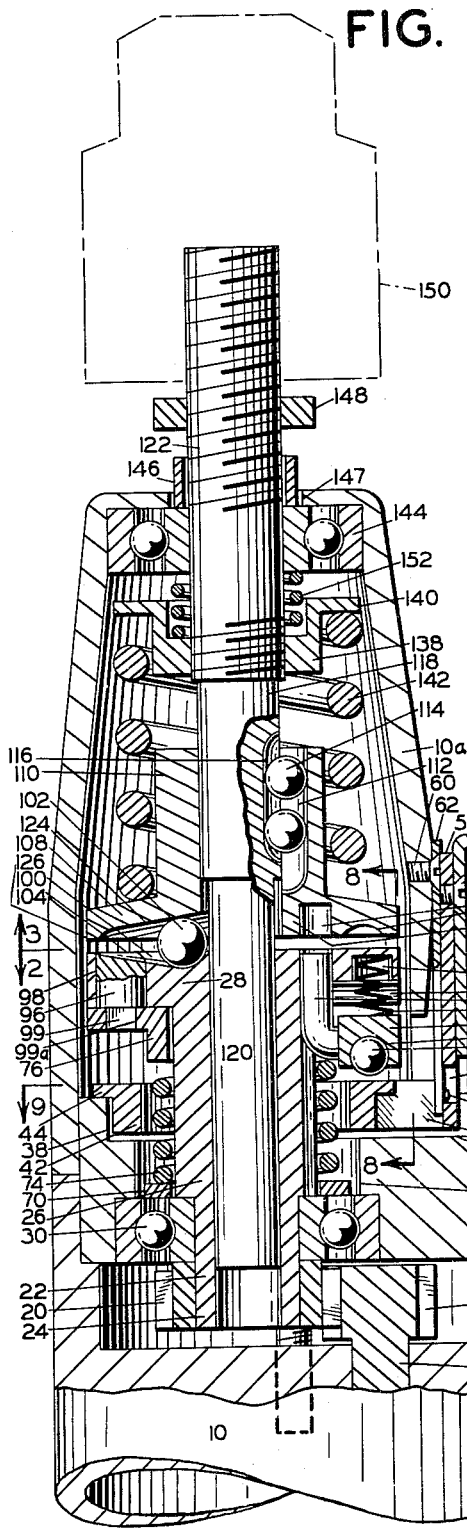
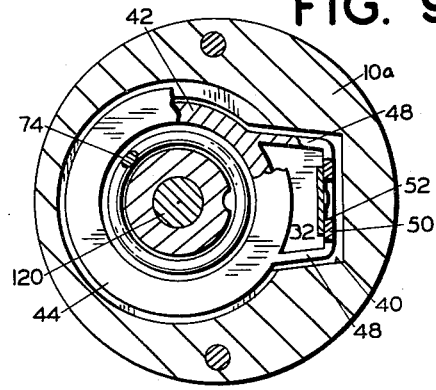
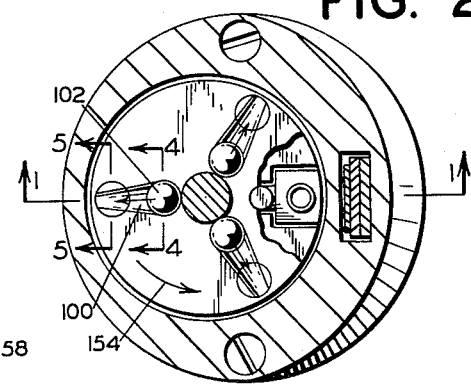
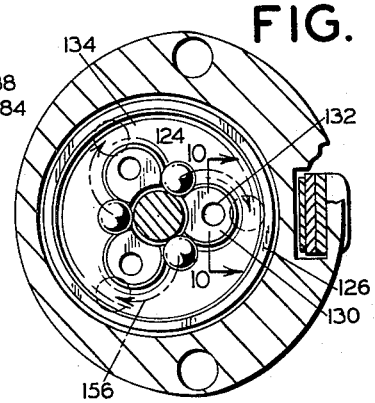
INVENTOR.
RANDALL J. SCHWAB
BY Eugene M. Eckelman
ATTORNEY March 29, 1966 R. J. SCHWAB 3,243,024
PRESSURE RELEASE DRIVE MECHANISM
Filed Nov. 1, 1963 2 Sheets-Sheet 2
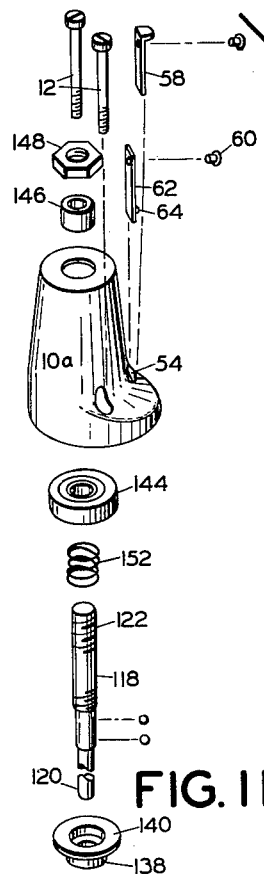
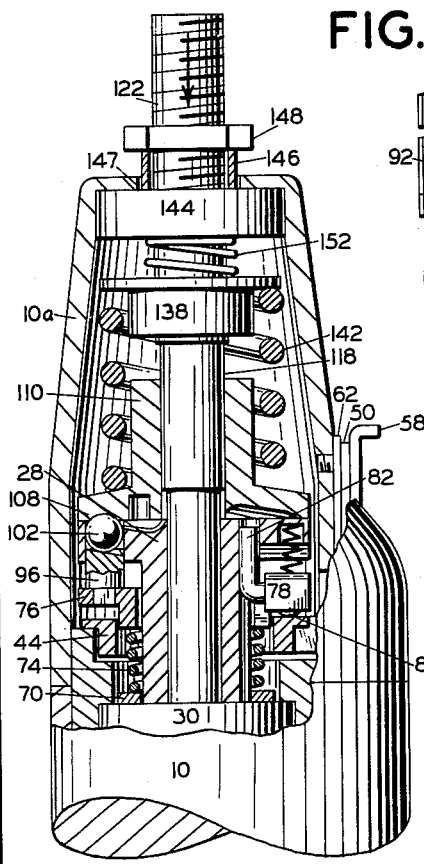
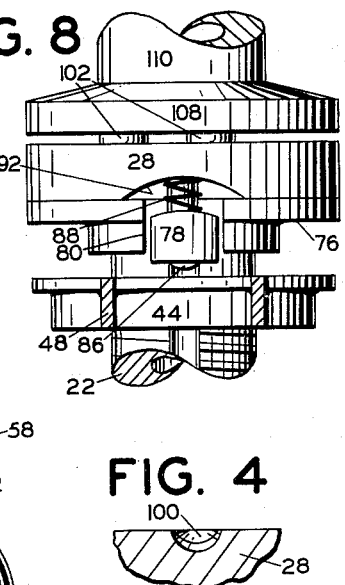
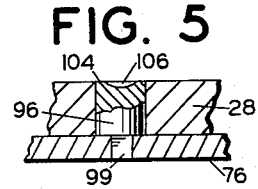
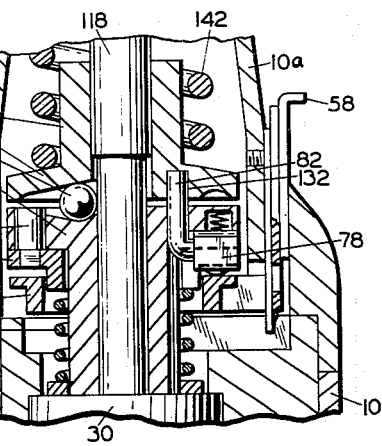
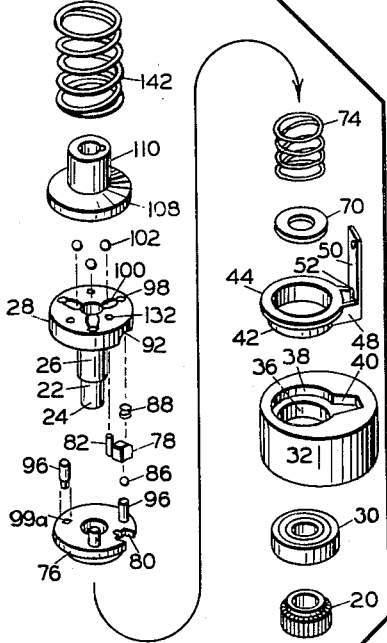
INVENTOR.
RANDALL J. SCHWAB
BY Eugene M. Eckelman
ATTORNEY

# United States Patent Office 3,243,024
Patented Mar. 29, 1966

3,243,024
PRESSURE RELEASE DRIVE MECHANISM
Randall J. Schwab, 4628 NE. 88, Portland, Oreg.
Filed Nov. 1, 1963, Ser. No. 320,644
7 Claims. (Cl. 192—56)

The present invention relates to a pressure release drive mechanism, and for purposes of illustration such mechanism is shown in combination with a portable electric drill. It is to be understood, however, that the principles of the present invention are applicable to other types of tools and the invention is not to be limited to the tool illustrated.

In the operation of an electric drill having a screw driver bit mounted in its chuck, it is desirable that means be provided to obtain temporary slippage or release of driving power on the bit when a desired torque resistance acts on said bit. Such slippage or release accomplishes proper setting of screws and prevents the screw driver bit from damaging the screw slot or from jumping out and damaging the area around the screw head after the screw is set. Furthermore, when need for such slippage or release terminates, it is desirable that the drive mechanism automatically revert to its drive function.

It is accordingly a primary objective of the present invention to provide a pressure release drive mechanism having a novel release structure which accomplishes the above advantages in that a drive connection is broken upon a selected torque resistance being applied to the article being driven but which upon reduction of such resistance is re-engaged for driving.

Another object is to provide a structure of the type described the release of which is governed by the longitudinal pressure applied by the operator between the tool and the article being driven, and further to provide setting means establishing a guide for the amount of pressure to be applied in the use of the instrument, such guide setting being particularly useful in the installation of a multiple number of identical fasteners.

Still another object is to provide a pressure release drive mechanism employing a lock mechanism adapted to render inoperative release means and provide a continuous non-release drive.

Additional objects and advantages will become apparent and the invention will be better understood from the following description taken in connection with the accompanying drawings which illustrate a preferred form of the mechanism.

In the drawings:

FIGURE 1 is a longitudinal sectional view through the present pressure release drive mechanism, taken on the line 1—1 of FIGURE 2;

FIGURE 2 is a cross sectional view taken on the line 2—2 of FIGURE 1 and showing a first clutch element in the release mechanism;

FIGURE 3 is a cross sectional view taken on the line 3—3 of FIGURE 1 and showing a second clutch element in the release mechanism;

FIGURES 4 and 5 are sectional views taken on the lines 4—4 and 5—5 of FIGURE 2, respectively, showing further details of clutching structure;

FIGURE 6 is an elevational view broken away to show parts in section and illustrating a release position of the clutching structure;

FIGURE 7 is a fragmentary view taken along the same section line as FIGURE 1 but showing engaging relation of locking mechanism to provide a continuous non-release drive;

FIGURE 8 is a sectional view taken on the line 8—8 of FIGURE 1 and illustrating further the locking mechanism;

FIGURE 9 is a sectional view taken on the line 9—9 of FIGURE 1 and also showing details of the locking mechanism;

FIGURE 10 is a sectional view taken on the line 10—10 of FIGURE 3; and

FIGURE 11 is an exploded view of the device showing component parts thereof in perspective.

Referring now in particular to the drawings the present mechanism is incorporated in a casing 10 the rearward end of which houses an electric motor, not shown. Casing 10 has a hollow nose section 10a removably secured thereto by studs 12, FIGURE 11.

Journaled in a transverse wall 14 disposed at the rearward end of casing 10 is an output shaft 16, FIGURE 1, from the drill motor. This shaft terminates in an integral pinion gear 18, FIGURES 1 and 11, which meshes with a driven gear 20 integrally mounted on a forwardly projecting sleeve 22. Sleeve 22 has a rearward section 24, an intermediate section 26, and a head or flanged portion 28 the forward surface of which comprises a clutching element, as will be seen in greater detail hereinafter. The rearward section 24 of the sleeve has journaled engagement in a bearing 30 mounted in a support block 32 fixed between offset wall portions 34 in the casing 10 and nose section 10a. Block 32 has a bore 36 offset from the axis of the block and a counterbore 38 at its upper surface. Leading radially from the counterbore 38 is a recess or groove 40.

Disposed in the counterbore 38 is a slidable lock actuating ring 42 having a flange 44. Projecting laterally from said ring 42 and contained in recess 40 of the block 32 is a pair of bracket arms 48, also seen in FIGURES 8 and 9, supporting an integral, forwardly extending, latch plate 50. Latch plate 50 has a notch 52 at its rearward end and projects forwardly through a longitudinal bore 54 in the casing section 10a. Latch plate 50 has attached thereto, as by screw 56, a finger engaging plate or handle 58. Also disposed in the bore 54 in a stationary, rearwardly projecting position, and secured in such position by means of a screw 60, is a latch leaf spring 62 having a detent 64 adjacent the rearward end thereof adapted for engagement with notch 52 of latch plate 50. Although the operation of the latch mechanism will be set forth in greater detail hereinafter it is clear that the lock actuating ring 42 has a rearward position, FIGURE 1, wherein detent 64 is engaged in notch 52 and a forward position, FIGURE 7, wherein the detent 64 is engaged with the rearward edge of the latch plate 50. The first position mentioned comprises a clutching position wherein drive mechanism automatically releases when a selected torque resistance is applied thereto and the second position mentioned comprises a non-clutching position.

Disposed around the sleeve section 26 and abutted against the washer 70 is a compression spring 74, the washer 70 seating on bearing 30. The other end of this spring bears against the inner surface of a flanged plate 76. This plate has a latch support block 78, also seen in FIGURE 8, slidably engaged in a recess 92 thereof, said block having a forwardly extending latch finger 82. Block 78 has a ball socket 84 in its rearward surface for carrying a ball 86 which projects from said rearward surface and is adapted for rolling engagement with the top surface of lock actuating ring 42. Such block is biased rearwardly by a compression spring 88 engageable at one of its ends with the forward surface of block 78 and seated in a recess 90 in the rearward surface of head 28. With reference to FIGURE 1 it is to be noted that recess 90 comprises an extension of a radially extending notched portion 92, also seen in FIGURE 8, in the rearward surface of head 28 and into which the block 78 may be slidably moved.

Associated with the plate 76 are three forwardly extending and equally spaced fingers 96. These fingers may or may not be secured to the plate 76 but preferably are not connected thereto. In this preferred construction, the rearward ends of the pins have rectangular tongues 99 slidably received in a correspondingly shaped socket 99a in the forward surface of plate 76. The fingers 96 are slidably engaged in apertures 98 projecting through head 28, and maintained in non-rotating relation by the tongues 99 and sockets 99a.

Leading radially inwardly from the forward opening ends of apertures 98 are grooves 100, and as best seen in FIGURES 1 and 4 such grooves deepen as they progress inwardly toward the center line of the head. Such grooves terminate just short of the interior opening of sleeve 22. In addition, as seen in FIGURE 2, the grooves 100 widen as they progress toward the center of the head.

Associated with the grooves 100 are balls 102, the widest dimension of said grooves being substantially the same as the diameter of the balls. Since the grooves deepen as they progress inwardly, it is apparent that the balls, when shifting outwardly will move forwardly relative to the upper surface of the head 28. In a rest position of the parts, the upper surface 104 of fingers 96 are disposed in the plane of the bottom of grooves 100 and are inclined to conform to said plane. Furthermore, as seen in FIGURE 5, the upper surfaces 104 of the fingers are grooved at 106 to form extensions of the grooves 100, whereby when the balls 102 roll outwardly in the grooves they engage the end surfaces of the fingers 96. As will be seen, when the balls assume this outer position in a clutching function they force the fingers 96 and of course the plate 76 rearwardly. The balls then are forced into apertures 98 as shown in FIGURE 6.

The head 28 and associated parts, comprising the plate 76 and balls 102, comprise one clutching element. This clutching element cooperates with a second clutching element comprising a head 108 having an integral forwardly extending sleeve 110. The sleeve 110 has an inner keyway 112 for receiving ball keys 114 in turn engageable in an external keyway 116 of an output shaft 118. The key and keyway connection just described provides for common rotation of sleeve 110 and shaft 118 but permits relative longitudinal sliding movement of these parts.

Shaft 118 has an inner reduced portion 120 projecting rotatably into the sleeve 22 and an outer enlarged portion 122 projecting forwardly through the casing 10a.

Referring now to the second clutching element the rearward surface 124 of head 108 is recessed, this recess deepening as it progresses inwardly. The inclination of said surface 124 is in a direction opposite from that of grooves 100. The recessed portion of surface 124 terminates short of the outer edge of the plate 108 to form a peripheral defining rib 126 which limits the outward movement of balls 102.

The lower surface 124 of the plate 108 has three projections 130 in each of which is provided an aperture 132. These apertures are radially located and of a size such that any one of them is capable of receiving the latch finger 82. As best seen in FIGURE 3, the projections 130 are generally circular and the outer ends thereof terminate short of the rib 126 a sufficient amount such that a raceway 134 is formed between the ends of the projections 130 and the rib 126. Relative rotation of the heads 28 and 108 can thus take place when the balls are in an outward position beyond the projections 130 and in said raceway. In the drive position of the device, the balls 102 are disposed in the grooves 100 of head 28 and between the projections 130 of plate 108 to establish a drive connection between said heads 28 and 108.

The rearward end of enlarged portion 122 of output shaft 118 threadedly mounts a collar 138 thereon having an outer flange 140. Mounted between the flange 140 and the plate 108 is a compression spring 142 which in operation is adapted to urge plate 108 downwardly to establish an engaging relation of the clutch elements. This spring, however, in a rest position of the parts exerts no force on the clutch element 108. Thus, as viewed in FIGURE 1, which illustrates a rest position, the spring 142 is fully expanded. Shaft portion 122 has journaled support in a forward bearing 144 and projects through an abutment sleeve 146 freely received in an aperture 147 in casing 10a and slidable on shaft portion 122. The outer end of shaft portion 122 is threaded for receiving a pressure guide nut 148 and a chuck 150.

A compression spring 152 is interposed between collar 138 and bearing 144. This spring serves to take up slack which may occur between the forward end of the housing and the clutch element 108, and is of less strength than spring 74 for a purpose described hereinafter.

Operation

The invention will be better understood in connection with the description of the operation as follows. In a rest position of the parts the balls 102 seat in the inner or deepest end of the grooves 100 and a rotatable drive connection is established between the two clutch elements and therefore between the motor output shaft 16 and chuck 150. In this drive connection the balls engage the side edges of the grooves 100 in clutch element 28 and the sides of projections 130 in clutch element 108. FIGURE 1 shows this drive connection. In such position, the plate 76 is urged against the rearward surface of head 28 by the spring 74 wherein fingers 96 project fully into apertures 98.

In this initial portion of the description of the operation it is assumed that the latch plate 50 has been moved rearwardly and held in such position by engagement of detent 64 in notch 52. This allows the spring 88 to urge the latch support block 78 rearwardly to disengage the latch finger 82 from apertures 132. This is the position of the latch wehrein it is desired that a clutching or release function be accomplished in the drive connection between the drill motor and the chuck.

The clutching function of the present mechanism is particularly useful in driving screws, and thus the chuck 150, for the purpose of illustration, will be assumed to carry a screwdriver bit. The bit is engaged with a screw to be driven and the electric motor of the mechanism energized. The operator presses forward sufficiently to maintain the bit in the screw slot as the screw rotates. This forward pressing function moves the housing 10 forwardly relative to the shaft 118 wherein spring 142 is compressed to the extent of such forward pressing. The drive direction of the chuck element 28 is designated by arrow 154 in FIGURE 2.

As the screw nears its fully engaged or threaded position the torque resistance to the drive mechanism increases and upon reaching a certain resistance the balls 102 will roll outwardly in the grooves 100. It is apparent that the balls 102, in this condition of increased torque resistance, roll straight outwardly along the grooves 100 with relation to the clutching element 28. In connection with clutching element 108, however, the balls take an arcuate path in the direction of arrows 156, FIGURE 3, since there will be a slight relative rotation between such clutching elements as the balls move outwardly.

When the torque resistance increases even more, as when the screw is set, the balls 102 move to their outermost limit position in engagement with the peripheral rib 126. As they reach this position, they are aligned with the outer ends of fingers 96 and since there is a longitudinal compressive force acting on the parts, the balls depress said fingers and their plate 76. Furthermore, in this outermost position the balls have moved outwardly beyond the edge of projections 130 and into the raceway 134. The balls then roll freely and provide no interconnection between the clutch elements, with the result that the drive connection to the chuck 150 is broken. Such position of the parts is shown in FIGURE 6.

When the torque resistance or longitudinal compressive force decreases or when the drill motor is shut off the fingers 96 are forced forwardly by the spring 74 acting on plate 76. Since the spring 74 is of a strength to overcome spring 152, the former spring is capable of shifting the upper clutch element 108 and its spring 142 forwardly. The amount of such forward shifting is sufficient to move the balls out of the apertures 98 for their return to the innermost end of the grooves 100. Thus, the clutching elements immediately re-engage when the torque resistance or forward pressing force is of selected decreased amount.

As stated hereinbefore, it is preferred that fingers 96 comprise elements separate from the plate 76. Such disconnected relation of these parts permits independent working of the fingers and their respective balls in the apertures and has been found to prevent the binding of plate 76 on the shaft portion 120 in its slidable movement thereon in connection with the clutching operation of the parts.

It is important to note that in connection with the present invention the torque resistance at which the clutch will release is dependent upon the amount of forward pressure exerted by the operator. That is, if a small screw is being inserted and a light forward pressure is applied, which in turn applies a very small engaging pressure on the clutching elements, a released condition will be achieved more readily. However, if a larger screw is being set, the operator merely needs to exert greater forward pressure on the tool since the increased forward pressure resists outward movement of the balls. The point at which the clutch elements release thus requires no mechanical adjustment but is accomplished automatically by the operator as the screw is being set. Furthermore, it is to be noted that when the clutch releases the balls 102 roll freely in the raceway 134 and there is no undesirable hammering or vibration to damage the slot of the screw being driven or cause the device to jump out of the screw slot and damage surrounding areas.

Pressure guide nut 148 is utilized in connection with abutment bushing 146 to indicate to the operator the forward pressure which should be applied to the tool to obtain the desired control in its clutch release. This guide is particularly useful when the tool is used to operate on multiple fasteners requiring similar drive functions, such as setting a plurality of common size screws. The nut is adjusted empirically when setting the first few screws, with such adjustment comprising an abutment, FIGURE 6, which the operator can feel, between the nut 148 and sleeve 146 at a precise forward pressure on the tool to set the screws in the best manner. Thus, the operator is guided in his application of forward pressure on the tool to adequately set the screws but not to over-press to damage the screw or surrounding area.

At times it is desired to provide a non-releasing drive connection between the motor and the chuck, and for this purpose the handle 58 is pulled forwardly to the position shown in FIGURE 7. This moves the lock actuating ring 42 forwardly which in turn moves the latch support block 78 forwardly into the notched portion 92. In this forward movement the finger 82 moves into one of the apertures 132 which locks the two clutch elements together to provide said non-releasing drive connection.

The parts are arranged such as to provide the advantages explained above and yet the tool assumes a compact structure.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A drive mechanism comprising a casing, a drive shaft journaled in said casing, a first clutch element rotatably driven by said drive shaft, a driven shaft, a second clutch element on said driven shaft adjacent said first clutch element, each of said clutch elements having an end surface and said end surfaces being disposed in facing relation, spring means biasing said second clutch element toward said first clutch element for engaging said clutch elements in response to a forward pressure exerted by the operator, the end surface of said first clutch element having at least one radial groove, the end surface of said second clutch element being inclined, ball engaging means on said inclined surface terminating short of a peripheral edge of said clutch element to form a raceway, and ball means interposed between said end surfaces and engaged by said ball engaging means and said grooves to establish a rotatable connection between said clutch elements, said ball means being movable along said inclined surface and said groove to spread said clutch elements against the action of said spring and to move into said raceway for interrupting the connection between said clutch elements upon a selected torque resistance being applied to said driven shaft.

2. The drive mechanism of claim 1 wherein said grooves are inclined in a direction opposite from the inclined direction of the end surface of said second clutch element.

3. The drive mechanism of claim 1 wherein the end surface of said first clutch element has apertures in the plane of said raceway for receiving said ball means.

4. The drive mechanism of claim 3 including spring pressed fingers projecting into said apertures.

5. The drive mechanism of claim 1 wheren said driven shaft is slidably mounted in the casing and said spring means has one end connected thereto and its other end bearing against said second clutch element, and adjustable means on said shaft arranged for abutment upon compression of said spring means whereby to form a guide to the operator for the amount of forward pressure to be exerted on the mechanism.

6. A drive mechanism comprising a casing, a drive shaft journaled in said casing, a first clutch element on said drive shaft, a driven shaft, a second clutch element on said driven shaft adjacent said first clutch element, each of said clutch elements having an end surface and said end surfaces being disposed in facing relation, means biasing one of said clutch elements toward the other, ball engaging means on a portion of said end surfaces, one of said end surfaces being inclined, and ball means interposed between said end surfaces and engaged by said ball engaging means to establish a rotatable connection between said clutch elements, said ball means being movable along said inclined surface to spread said clutch elements against the action of said biasing means, one of said end surfaces having apertures out of the plane of said ball engaging means for receiving said ball means whereby the latter are arranged to move out of engagement with said ball engaging means for interrupting the connection between said clutch elements upon a selected torque resistance being applied to said driven shaft.

7. A drive mechanism comprising a casing, a drive shaft journaled in said casing, a first clutch element on said drive shaft, a driven shaft, a second clutch element on said driven shaft adjacent said first clutch element, each of said clutch elements having an end surface and said end surfaces being disposed in facing relation, means biasing one of said clutch elements toward the other, ball engaging means on a portion of said end surfaces, one of said end surfaces being inclined, ball means interposed between said end surfaces and engaged by said ball engaging means to establish a rotatable connection between said clutch elements, said ball means being movable along said inclined surface to spread said clutch elements against the action of said biasing means and to move out of engagement with said ball engaging means for iterrupting the connection between said clutch elements upon a selected torque resistance being applied to said driven shaft, and lock means arranged to interconnect said clutch elements to provide a non-clutching connection between said drive and driven shafts.

References Cited by the Examiner
UNITED STATES PATENTS 2,957,323  10/1960  Elliott et al. _____ 64—29
2,969,132  1/1961  Stewart _____ 192—56

DAVID J. WILLIAMOWSKY, *Primary Examiner.*

DON A. WAITE, A. T. McKEON, *Assistant Examiners.*